US008819105B2

(12) United States Patent
Li et al.

(10) Patent No.: US 8,819,105 B2
(45) Date of Patent: Aug. 26, 2014

(54) METHOD AND SYSTEM FOR DATA FORMATTING

(75) Inventors: Jie Li, Mountainside, NJ (US); David Tazartes, New York, NY (US); Yukun Gou, Wayne, PA (US)

(73) Assignee: Barclays Capital Inc., New York, NY (US)

( * ) Notice: Subject to any disclaimer, the term of this patent is extended or adjusted under 35 U.S.C. 154(b) by 381 days.

(21) Appl. No.: 12/289,924

(22) Filed: Nov. 6, 2008

(65) Prior Publication Data

US 2009/0144381 A1     Jun. 4, 2009

Related U.S. Application Data

(60) Provisional application No. 60/986,201, filed on Nov. 7, 2007.

(51) Int. Cl.
*G06F 15/16* (2006.01)

(52) U.S. Cl.
USPC ........... 709/201; 709/202; 709/203; 709/206; 705/35

(58) Field of Classification Search
USPC ......... 709/206, 201, 202, 203; 705/37, 75, 35
See application file for complete search history.

(56) References Cited

U.S. PATENT DOCUMENTS

| | | | |
|---|---|---|---|
| 6,311,221 B1 | 10/2001 | Raz et al. | |
| 7,130,885 B2 * | 10/2006 | Chandra et al. | 709/206 |
| 7,315,807 B1 * | 1/2008 | Lavallee et al. | 703/21 |
| 7,454,486 B2 * | 11/2008 | Kaler et al. | 709/223 |
| 7,606,836 B2 * | 10/2009 | Lambert et al. | 1/1 |
| 2002/0059410 A1 * | 5/2002 | Hara et al. | 709/223 |
| 2002/0112055 A1 * | 8/2002 | Capers et al. | 709/225 |
| 2002/0138449 A1 * | 9/2002 | Kendall et al. | 705/75 |
| 2002/0138582 A1 * | 9/2002 | Chandra et al. | 709/206 |
| 2003/0084277 A1 * | 5/2003 | Przywara et al. | 713/1 |
| 2003/0172172 A1 * | 9/2003 | de Bonet et al. | 709/230 |
| 2004/0010570 A1 * | 1/2004 | Kaler et al. | 709/220 |
| 2004/0039993 A1 * | 2/2004 | Kougiouris et al. | 715/513 |
| 2004/0236668 A1 * | 11/2004 | Toffey | 705/37 |
| 2005/0210263 A1 * | 9/2005 | Levas et al. | 713/182 |
| 2007/0198437 A1 * | 8/2007 | Eisner et al. | 705/79 |

OTHER PUBLICATIONS

International Patent Application No. PCT/US2008/012499, International Preliminary Report on Patentability, dated May 11, 2010, 2 pages.
International Patent Application No. PCT/US2008/012499, International Search Report and Written Opinion of the International Searching Authority, dated Jan. 9, 2009, 7 pages.

* cited by examiner

*Primary Examiner* — Jimmy H Tran
(74) *Attorney, Agent, or Firm* — Morgan Lewis & Bockius LLP

(57) ABSTRACT

A system includes a data store and a server in communication with the data store. The server includes formatting modules having a plurality of formatters, validation modules having a plurality of validators, and a streaming module. The server is configured to receive messages containing financial transaction data from one or more electronic communication networks or one or more client devices. The formatters are configured for each of the electronic communication networks or client devices and convert the messages into an internal format of the streaming system. The validation modules are configured to perform a validation check on the one or more formatted messages.

22 Claims, 2 Drawing Sheets

METHOD AND SYSTEM FOR DATA FORMATTING

This application claims the benefit of the U.S. Provisional Patent Application No. 60/986,201 filed on Nov. 7, 2007, which is hereby incorporated by reference.

BACKGROUND OF THE INVENTION

1. Field of the Invention

The present invention relates to a method and system for formatting financial data, and more particularly to a method and system for formatting and validating financial information exchange (FIX) protocol data.

2. Discussion of the Related Art

Banks and other financial entities offer their customers opportunities to trade in various financial transactions, such as currencies. Currency trading is also known as foreign exchange, ForEx, or FX. Typically, the bank presents to a customer a list of currencies from which the customer can select a pair, or the bank may display a list of currency pairs. In any event, the bank associates prices to each currency pair. The bank uses a communication protocol, such as the FIX protocol, to communicate with different customers to relay the price information.

Generally, if a customer is buying, an exchange rate (usually given as base currency/quote currency) specifies how much the customer must pay in the quote currency to obtain one unit of the base currency. If the customer is selling, the exchange rate specifies how much the customer would get in the quote currency when selling one unit of the base currency. The pricing information is based on many factors such as the electronic communications network (ECN) on which the FX is traded, customer name, order size, etc. All of the information is communicated back and forth between the banks and their customers using the communication protocol (e.g., FIX protocol).

After getting a price request for a currency pair from a customer, banking systems may take many steps before sending prices back to the customer. The steps include receiving messages, such as FIX messages, from an ECN regarding the currency pair and formatting the message into internal and uniform data representation. Based on the received information and additional information, such as the customer's credit data, the price is calculated. The price or trading information is eventually translated into external messages and transmitted to the customers. However, because many details of the communication protocol, such as the FIX protocol, are not defined, the information contained in the messages may result in different interpretations by different customers. Because the system has to deal with many external customers, some customers may try to take advantage of the system to make a profit by sending messages with improper data to defraud the system. Accordingly, there is a need to validate and check the incoming messages as well as translate the message into an internal format and send price information to the customers.

Moreover, prior art systems dealing with different customers have to spend a large amount of time and effort to format and validate the message data. Because the formatting logic is integrated into the main processing system, it is difficult for the main system to deal with different and changing messages from the ECN and the customers. Accordingly, there is a need for formatters that are configurable and replaceable for each ECN and customer.

SUMMARY OF THE INVENTION

Accordingly, the present invention is directed to a method and system for financial data formatting that substantially obviates one or more problems due to limitations and disadvantages of the related art.

An embodiment of the present invention provides a method and system for financial data formatting that is configurable and replaceable for each ECN and customer.

Another embodiment of the present invention provides a method and system for financial data formatting that is separate from the main system.

Another embodiment of the present invention provides a method and system for financial data formatting that includes validation of the financial data to verify the information contained therein.

Yet another embodiment of the present invention provides a method and system for FIX data formatting and validation.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail to the embodiments of the present invention, examples of which are illustrated in the accompanying drawings.

Figure 1:
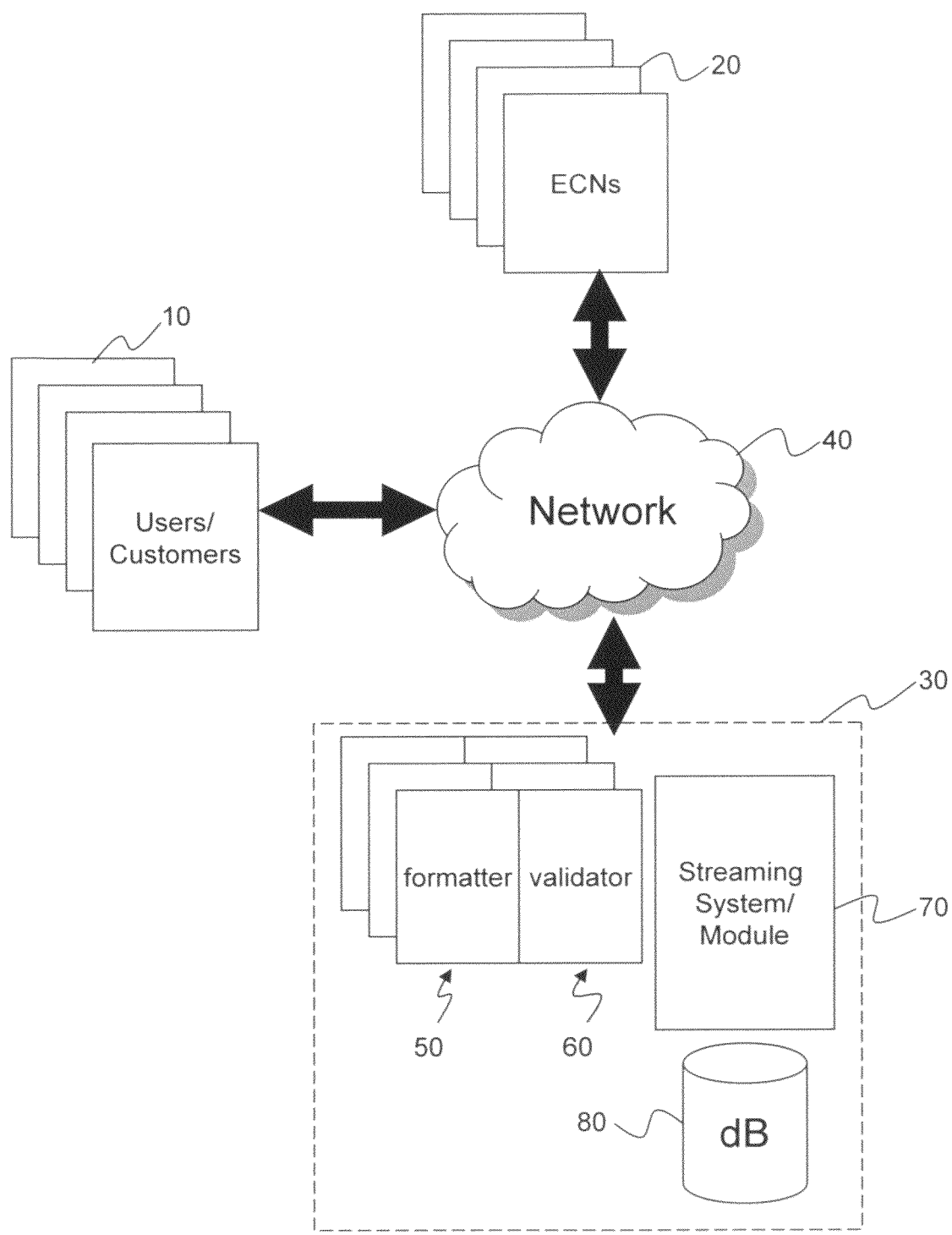
FIG. 1 is a system diagram of an exemplary embodiment of the present invention.

FIG. 1 illustrates an exemplary embodiment of the present invention. As shown in FIG. 1, client devices 10 and electronic communication networks (ECNs) 20 are in communication with server 30 at a financial institution, for example, through a communications network 40. The client devices 10 may be any communication device such as computers, cell phones, personal digital assistants (PDAs), and the like. The client devices 10 may be used by customers requesting financial information, for example, such as a price for FX. Any type of alternative trading system (ATS) may be used in addition to ECNs 20. The communications network 40 may be any data communications network, such as point-to-point connection, local area network, wide area network, Intranet, Internet, cellular network, and the like. The client devices 10 and ECNs 20 are in communication with the server 30 to send and receive financial transaction data, such as currency exchanges (FX), U.S. treasuries, credit default swap indices (CDX), interest rate swaps, bonds, and equities. In one embodiment, the FIX protocol is used to send and receive financial transaction data. However, other protocols may be used in other type of transaction systems without departing from the scope of the present invention.

The server 30 includes a formatting module 50, a validation module 60, streaming system/module 70, and data store 80. When messages are received from the client devices 10 and/or ECNs 20, the incoming messages are processed in the formatting module 50 to translate the message into a format or standard data structure that maps to internal objects of the streaming system/module 70. For example, the formatting module 50 normalizes the data in the messages and converts external names/codes specific to the user of the client device 10 into internal product names/codes used by the streaming system/module 70. Other formatting may be implemented without departing from the scope of the present invention.

The data in the formatted messages are then verified in the validation module 60 that performs syntax check, data range check, and other security checks against a preconfigured set of values. For example, if the message contains a desired number of units of a particular currency, then the desired number of units for the particular currency is checked to ensure it is a valid amount. This enables the system to detect messages that are fraudulent or improper. Other validation checks may be implemented without departing from the scope of the present invention. Alternatively, the validation and formatting may be performed in reverse order without departing from the scope of the present invention.

The formatted and verified messages are then forwarded to the streaming system/module 70. The messages may be processed to be stored in data store 80, the streaming system/module 70 may process information in the data store 80 to fulfill requests included in the processed message, or any combination thereof. In response, messages that the streaming system/module 70 generates to be sent to ECNs 20 and/or client devices 10 are processed by the formatting module 50 to be converted into the format of the recipient ECN or client device.

The formatting module 50 includes logic executed by one or more processors to handle different ECN or client device messages having specific formats, converts them into standard data structures that map to internal objects of the streaming system/module 70. The formatting module 50 is configurable for individual ECN and client devices so as to be easily adaptable to the dynamic and fast-paced nature of the message formatting requirements. For example, the formatting module 50 may include a plurality of formatters, each formatter configured for a specific ECN 20 or client device 10. In instances where some ECNs 20 or client devices 10 have the same format, a formatter may be shared between multiple ECNs 20 and/or client devices 10. Likewise, the validation module 60 may include a plurality of validators, each validator specifically configured for a specific ECN 20 or client device 10. In instances where some ECNs 20 or client devices 10 have the same format, a validator may be shared between multiple formatters.

In an exemplary embodiment, the formatters and validators are embodied as plug-in modules to the streaming system/module 70. Accordingly, the formatting module 50 and the validation module 60 may be modified or replaced without impacting the streaming system/module 70. In this way, whenever there is a need to change the message, such as the FIX message, due to business requirements, a new or modified formatting module 50 and validation module 60 may be implemented without any changes to the streaming system/module 70. Similarly, if there is a new ECN 20 or client device 10 that requires access to the server 30, a new formatter/validator tailored to the new ECN 20 or client device 10 may be added, or the new ECN 20 or client device 10 may be associated with an already existing formatter/validator with no logic change needed to the streaming system/module 70 in either case. Because different ECNs 20 and client devices 10 may share the same formatters, and a different formatter may share the same validators, the system and method of the present invention is extremely flexible, secure, and cost effective.

Figure 2:
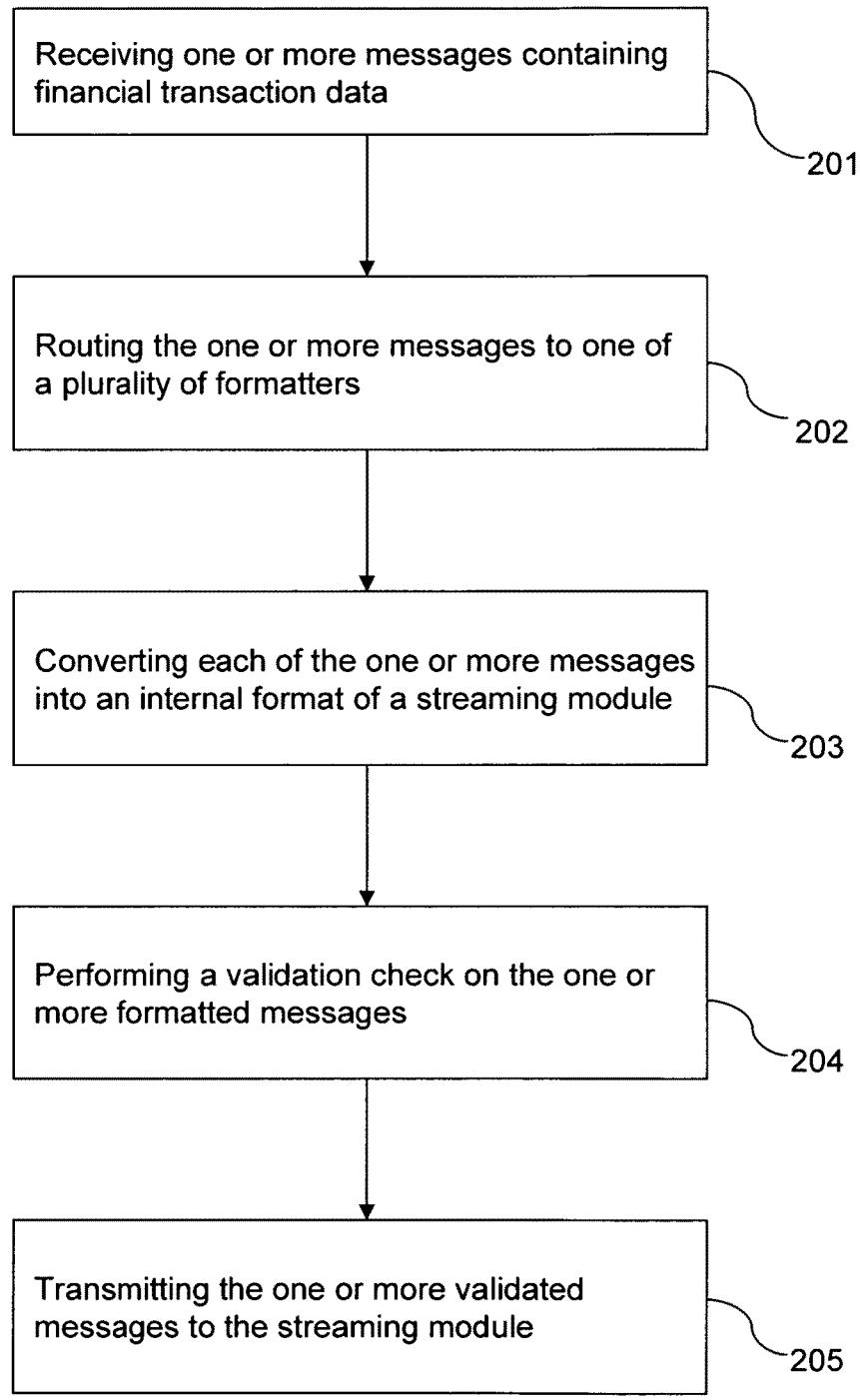
FIG. 2 is an exemplary process flow in accordance with the present invention.

FIG. 2 illustrates an exemplary process flow in accordance with the present invention. At step 201, server 30 receives messages from the client devices 10 or ECNs 20. The messages may be routed by server 30 to one of the formatters 50 (step 202). In an exemplary embodiment, the formatters 50 are each configured for a specific client device 10 or ECN 20. The messages are then routed to the specific formatter 50 based on which client device 10 or ECN 20 that is transmitting the message.

At step 203, each of the specific formatters 50 receiving messages may convert those messages from an external format of the client devices 10 or ECNs 20 into an internal format of the streaming system/module 70. The formatted messages may be validated using a validation check by one of the validators 60 (step 204). The validated messages may then be communicated to the streaming system/module 70 for additional processing (step 205) and can be stored in data store 80 (not shown).

While the present invention has been described in the context of streaming systems, such as a foreign exchange pricing system, those skilled in the art will recognize that the present invention is equally applicable in the context of other streaming systems and other communication protocols without departing from the scope of the present invention. For example, any and all products and systems that communicate with multiple customers in FIX messages benefit from the present invention, such as, but not limited to, U.S. Treasuries, Credit Default Swap Indices (CDX), Interest Rate Swaps, other bonds (government, agency, or corporate), and equities.

Thus, it will be apparent to those skilled in the art that various modifications and variations can be made in the method and system of the present invention without departing from the spirit or scope of the invention. Thus, it is intended that the present invention cover the modifications and variations of this invention provided they come within the scope of the appended claims and their equivalents.

What is claimed is:

1. A computer-implemented system, comprising:
   a data store; and
   a server in communication with the data store, the server comprising instructions stored in memory executed by a processor, the server including:
   a formatting module having a plurality of formatters,
   a validation module having a plurality of validators, and
   a streaming module,
   the server receiving one or more messages containing financial transaction data from the plurality a plurality of client devices, each of the plurality of formatters corresponding to a different client device of the plurality of client devices, the plurality of formatters converting the one or more messages into an internal format of the streaming module, the plurality of validators performing a validation check on the one or more messages formatted in the internal format,
   wherein at least one of the plurality of formatters and at least one of the plurality of validators is a plug-in to the streaming module, wherein the internal format maps to one or more internal objects of the streaming module, wherein the streaming module receives the one or more messages from the plurality of validators; processes the one or more messages formatted in the internal format and validated; and generates one or more messages for transmission, wherein the plurality of formatters convert the one or more messages received from the streaming module into one or more formats of one or more electronic communication networks or the plurality of client devices, and wherein the validation check includes at least one of a syntax check, a data range check, and a security check against one or more preconfigured values.

2. The system of claim 1, wherein the server receives one or more messages using a financial information exchange (FIX) protocol.

3. The system of claim 1, wherein the financial transaction data includes data about currency exchange, treasuries, credit default swap indices, interest rate swaps, bonds, and equities.

4. The system of claim 1, wherein the plurality of formatters normalize the financial transaction data contained in the one or more messages.

5. The system of claim 1, wherein the plurality of validators transmit the one or more messages formatted in the internal format and validated to the streaming module for processing.

6. The system of claim 1, wherein the data store stores the one or more messages formatted in the internal format and validated.

7. The system of claim 1, wherein the plurality of formatters and the plurality of validators are compatible with one or more electronic communication networks or the plurality of client devices.

8. A method, comprising:
receiving one or more messages containing financial transaction data from a plurality of client devices;
routing the one or more messages to one of a plurality of formatters, each of the plurality of formatters corresponding to a different client device of the plurality of client devices;
converting the one or more messages into an internal format of a streaming module;
performing a validation check on the one or more messages formatted in the internal format;
transmitting the one or more messages formatted in the internal format to the streaming module;
processing the one or messages formatted in the internal format;
generating one or more messages for transmission;
transmitting the one or more messages for transmission to the plurality of formatters;
converting the one or more messages for transmission into one or more formats of one or more electronic communication networks or the plurality of client devices,
wherein the internal format maps to one or more internal objects of the streaming module,
wherein at least one of the plurality of formatters and at least one of the plurality of validators is a plug-in to the streaming module, and
wherein the validation check includes at least one of a syntax check, a data range check, and a security check against one or more preconfigured values.

9. The method of claim 8, wherein the step of receiving further includes receiving the one or more messages using a financial information exchange (FIX) protocol.

10. The method of claim 8, wherein the step of transmitting further includes transmitting the one or more messages using a financial information exchange (FIX) protocol.

11. The method of claim 8, wherein the financial transaction data includes data about currency exchange, treasuries, credit default swap indices, interest rate swaps, bonds, and equities.

12. The method of claim 8 further comprising the step of normalizing the financial transaction data contained in the one or more messages.

13. The method of claim 8 further comprising the step of storing in a data store the one or more messages formatted in the internal format and validated.

14. The method of claim 8, wherein the plurality of formatters and the plurality of validators are configured for one or more electronic communication networks or the plurality of client devices.

15. The method of claim 8, wherein the step of receiving further comprises receiving the one or more messages from one or more electronic communication networks or one or more client devices and the step of routing the one or more messages is based on the electronic communication network or the client device transmitting the one or more messages.

16. A computer program product including a non-transitory computer storage medium having stored thereon computer executable instructions that, when executed by a computer, direct the computer to perform a method comprising the steps of:
receiving one or more messages containing financial transaction data from a plurality of client devices;
routing the one or more messages to one of a plurality of formatters, each of the plurality of formatters corresponding to a different client device of the plurality of client devices;
converting the one or more messages into an internal format of a streaming module;
performing a validation check on the one or more messages formatted in the internal format using one of a plurality of validators; and
transmitting the one or more messages formatted in the internal format to the streaming module;
processing the one or messages formatted in the internal format;
generating one or more messages for transmission;
transmitting the one or more messages for transmission to the plurality of formatters;
converting the one or more messages for transmission into one or more formats of one or more electronic communication networks or the plurality of client devices,
wherein the internal format maps to one or more internal objects of the streaming module,
wherein at least one of the plurality of formatters and at least one of the plurality of validators is a plug-in to the streaming module, and
wherein the validation check includes at least one of a syntax check, a data range check, and a security check against one or more preconfigured values.

17. The computer program product of claim 16 further including computer executable instructions that, when executed by the computer, configure the computer to perform the step of receiving the one or more messages using a financial information exchange (FIX) protocol.

18. The computer program product of claim 16 further including computer executable instructions that, when executed by the computer, configure the computer to perform the step of transmitting the one or more messages using a financial information exchange (FIX) protocol.

19. The computer program product of claim 16, wherein the financial transaction data includes data about currency exchange, treasuries, credit default swap indices, interest rate swaps, bonds, and equities.

20. The computer program product of claim 16 further including computer executable instructions that, when executed by the computer, configure the computer to perform the step of normalizing the financial transaction data contained in the one or more messages.

21. The computer program product of claim 16 further including computer executable instructions that, when executed by the computer, configure the computer to perform the step of storing in a data store the one or more messages formatted in the internal format and validated.

22. The computer program product of claim 16 further including computer executable instructions that, when executed by the computer, configure the computer to perform the step of
- receiving the one or more messages containing financial data from one or more electronic communication networks or one of the plurality of client devices and
- routing the one or more messages to one of the plurality of formatters based on the electronic communication network or the client device transmitting the one or more messages.

* * * * *